Aug. 2, 1955  F. L. GEARY  2,714,285
NOZZLE ACTUATING SYSTEM
Filed Nov. 2, 1950  5 Sheets-Sheet 1
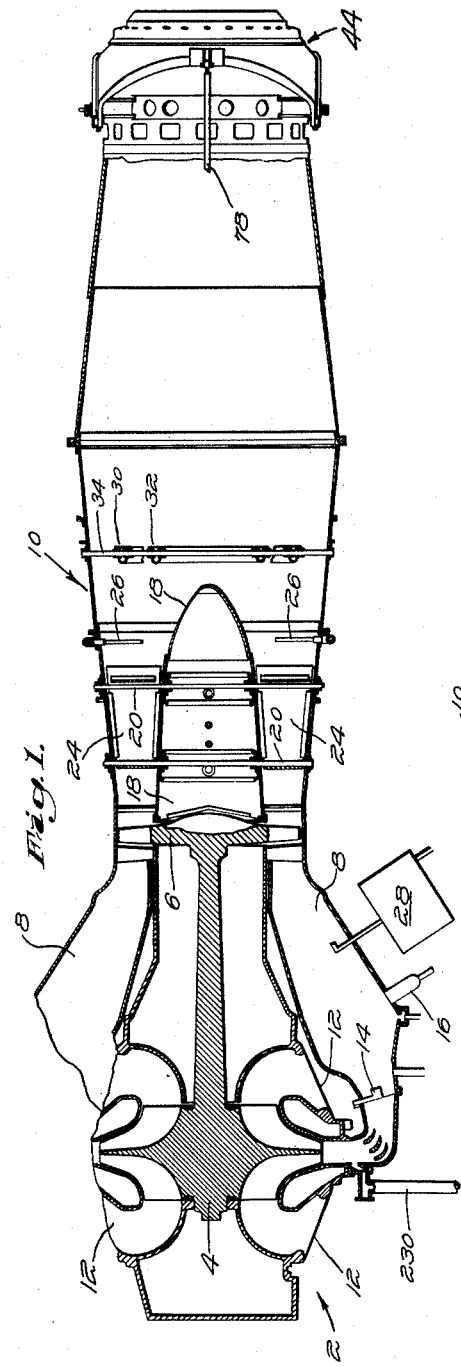
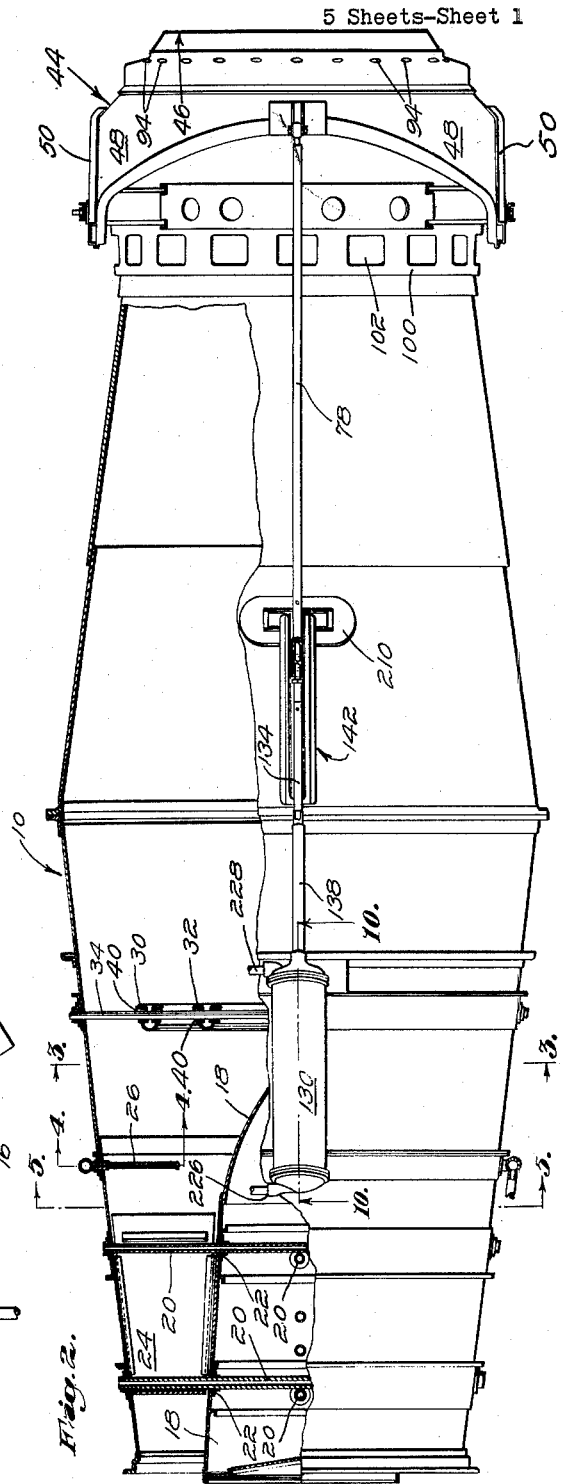
Inventor
Frederick L. Geary
by Jack N. McCarthy
Agent

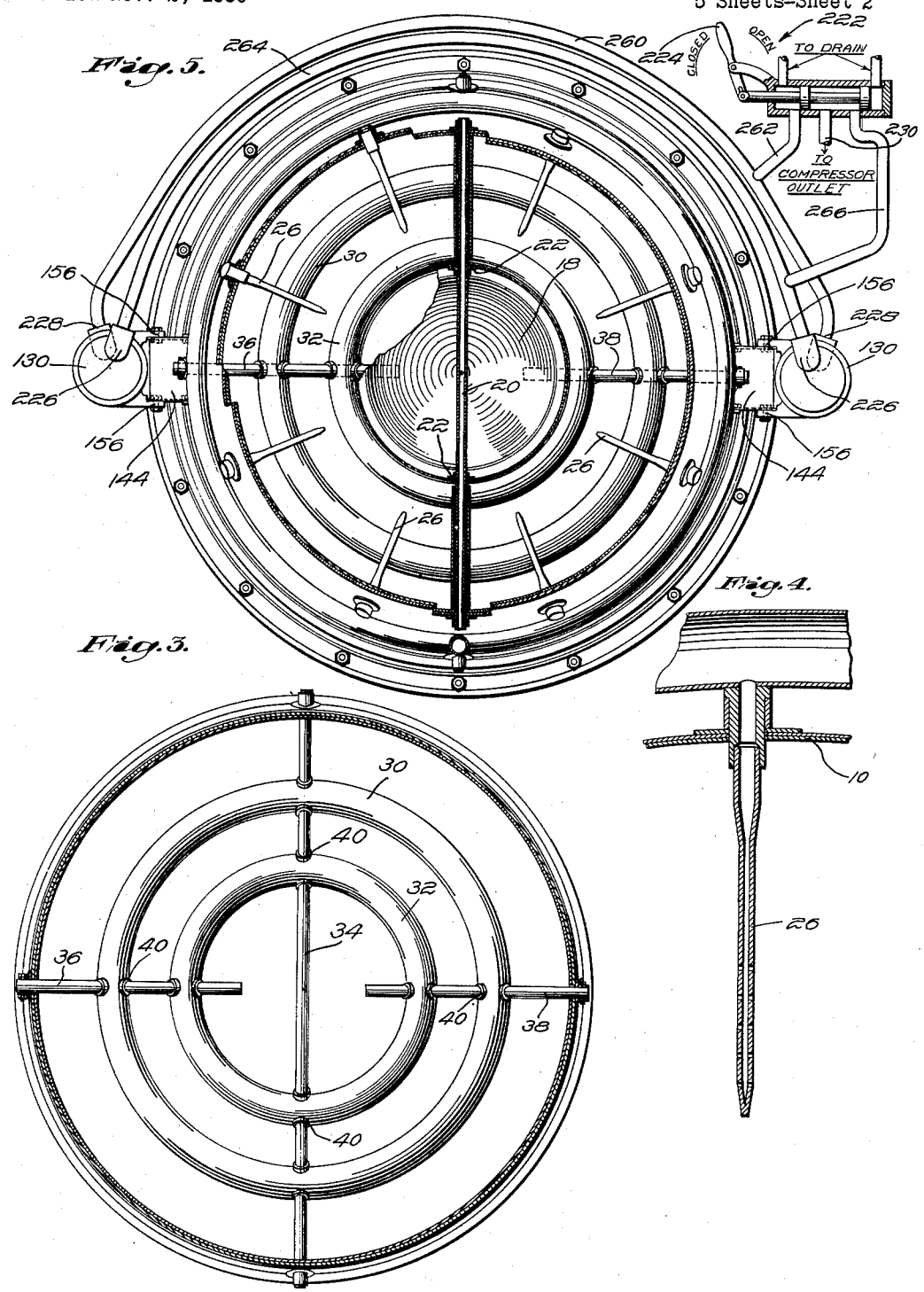

Aug. 2, 1955  F. L. GEARY  2,714,285
NOZZLE ACTUATING SYSTEM
Filed Nov. 2, 1950  5 Sheets-Sheet 3
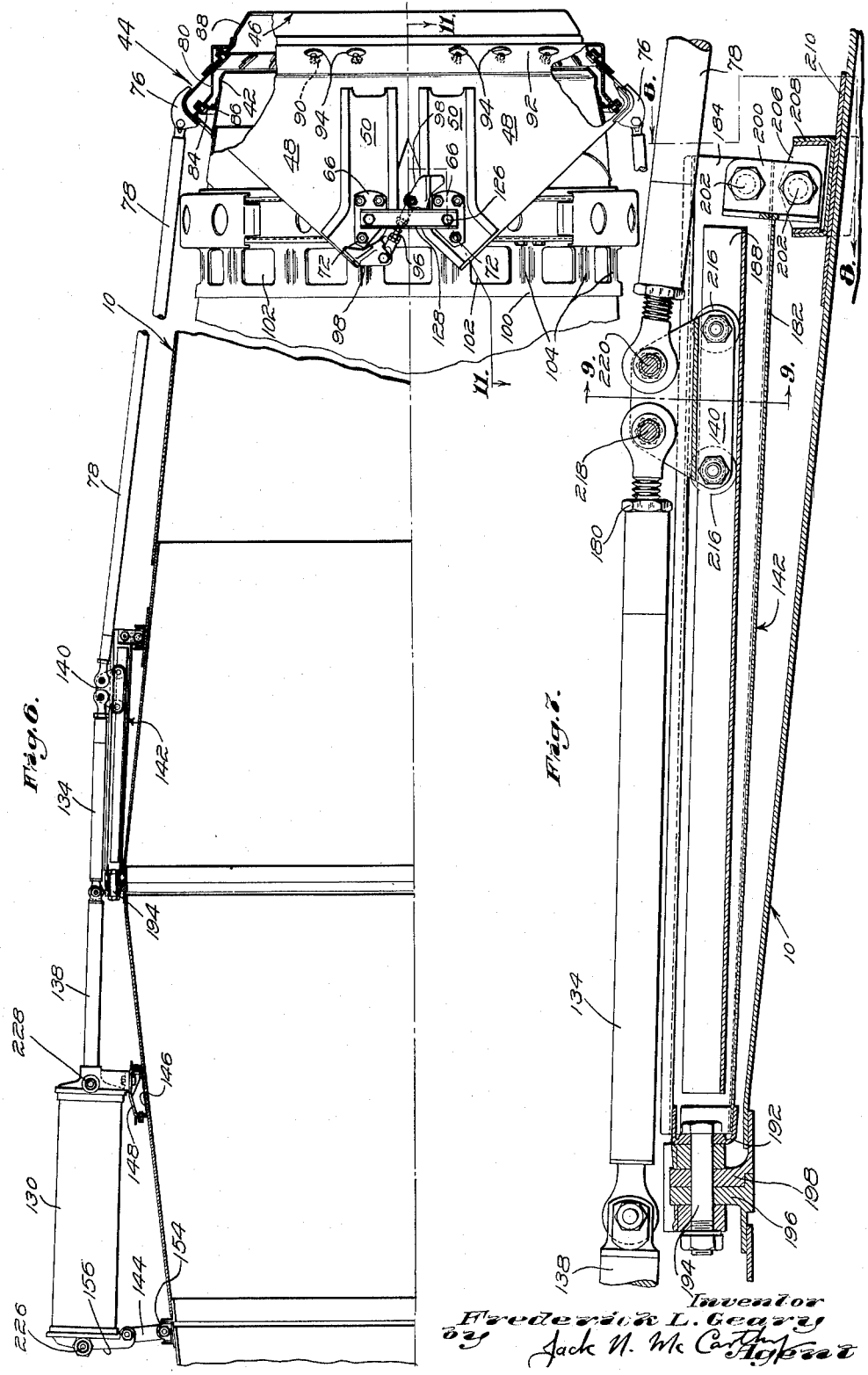

Aug. 2, 1955   F. L. GEARY   2,714,285
NOZZLE ACTUATING SYSTEM
Filed Nov. 2, 1950   5 Sheets-Sheet 4
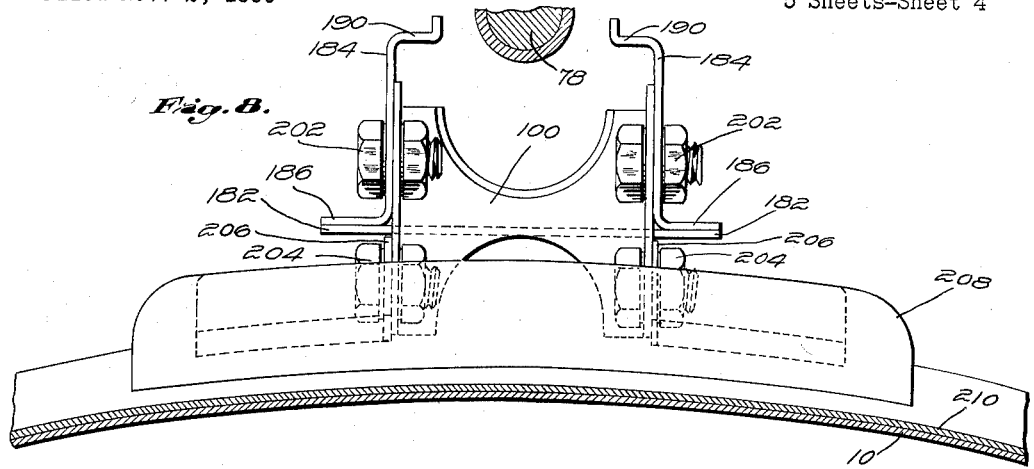
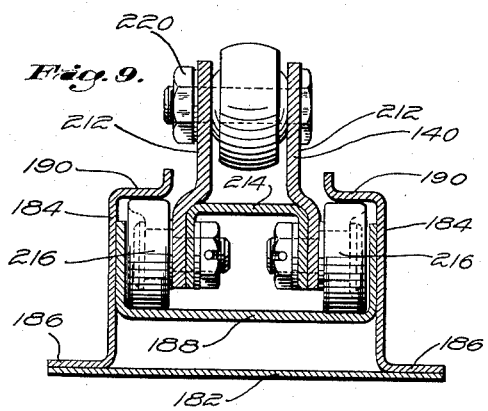
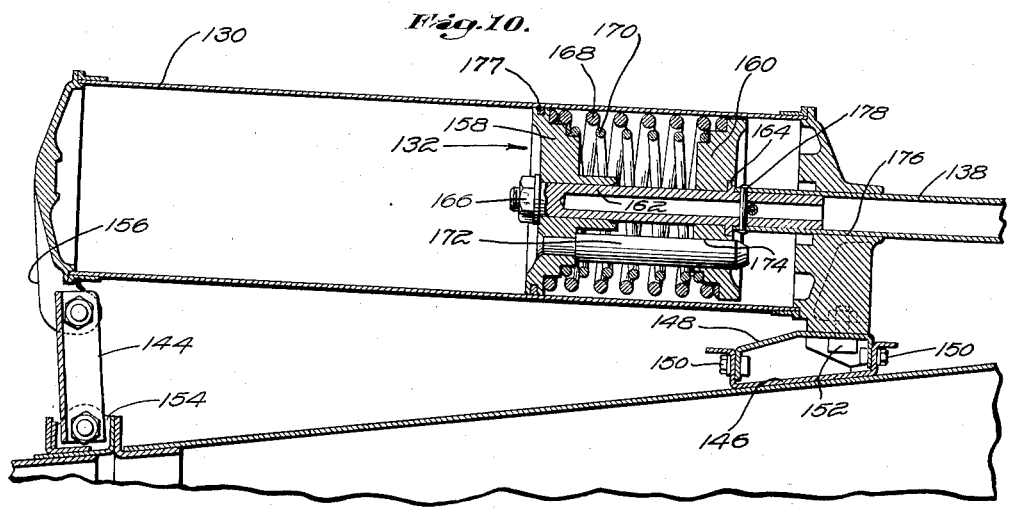
Inventor
Frederick L. Geary
by Jack N. McCarthy
Agent Aug. 2, 1955     F. L. GEARY     2,714,285
NOZZLE ACTUATING SYSTEM
Filed Nov. 2, 1950     5 Sheets-Sheet 5
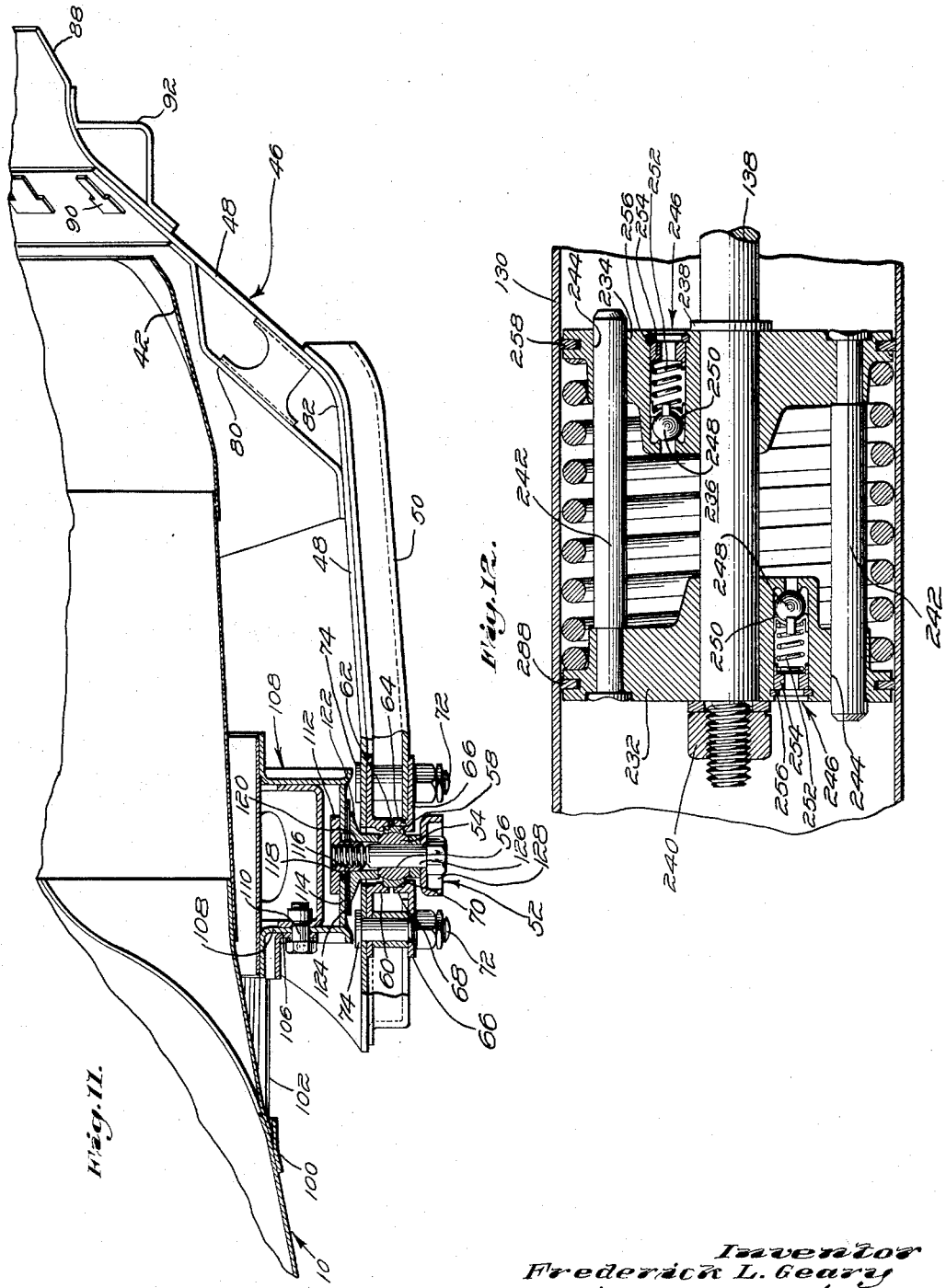
Inventor
Frederick L. Geary
by Jack N. McCarthy
Agent

United States Patent Office 2,714,285
Patented Aug. 2, 1955

2,714,285

NOZZLE ACTUATING SYSTEM

Frederick L. Geary, Springfield, Mass., assignor to United Aircraft Corporation, East Hartford, Conn., a corporation of Delaware Application November 2, 1950, Serial No. 193,734

8 Claims. (Cl. 60—35.6)

This invention relates to a nozzle actuating system. Particular reference is made in this specification to the actuation of a nozzle for an afterburner of a jet engine.

In operating the afterburner on a jet engine effectively it is necessary to change the area of the exhaust nozzle of the afterburner. This area must be larger when the afterburner is operating so that excessive temperatures will not be built up at the turbine of the jet engine. Furthermore, the area must change very quickly as the temperature increase is rapid. The actuating system to operate to change the area of the exhaust nozzle of the afterburner, which is the subject of this specification, must withstand the high temperatures adjacent the afterburner. This actuating system must also be constructed so that it will not have to carry excessive loads throughout which could occur under certain conditions.

An object of this invention is to provide a means for actuating a nozzle for an afterburner which will not be affected by the temperatures produced by the afterburner or the pressure imposed by the control.

A further object is to provide a nozzle actuating system which will insure that as the multi-piece nozzle opens or closes the pieces move together.

Other objects and advantages will be apparent from the specification and from accompanying drawings which illustrate the invention.

Fig. 1 is a side elevation in cross section of a turbojet engine with an afterburner attached.

Fig. 2 is a side elevational view partially in section of the afterburner of Fig. 1 showing the nozzle actuating system.

Fig. 3 is a view taken along the line 3—3 of Fig. 2 showing the flame holders.

Fig. 4 is a view taken along the line 4—4 of Fig. 2 showing a fuel nozzle.

Fig. 5 is a view taken along the line 5—5 of Fig. 2 showing the two nozzle actuating cylinders mounted.

Fig. 6 is an enlarged plan view of the nozzle actuating system.

Fig. 7 is an enlarged plan view of the car and track of the nozzle actuating system.

Fig. 8 is a view taken along the line 8—8 of Fig. 7 showing an end view of the track of the nozzle actuating system.

Fig. 9 is a view taken along the line 9—9 of Fig. 7 showing a cross section of the car and track of the nozzle actuating system.

Fig. 10 is a view taken along the line 10—10 of Fig. 2 showing a cross section of the nozzle actuating cylinder.

Fig. 11 is an enlarged view taken along the line 11—11 of Fig. 6.

Fig. 12 is a view showing a modification of a piston as used in the cylinder shown in Fig. 10.

The turbojet engine 2 shown is of the type having a centrifugal compressor 4 driven by a turbine 6 and having combustion chambers 8 therebetween. However, in place of the usual tail cone an afterburner 10 is attached to provide a means of increasing the thrust of the turbojet engine.

The engine has two annular intake openings 12 to direct the incoming air into the annular compressor inlets. Compressed air from the compressor 4 passes to the turbine through the combustion chambers 8 where it is mixed with fuel from fuel nozzles 14. The fuel-air mixture is initially ignited within the combustion chambers 8 by igniting means 16.

From the turbine the gas is passed into the afterburner 10 around a cone 18 in the diffuser section of the afterburner. The cone is floatably supported on four cross rods 20 each fixed at only one end to the afterburner and which pass through bushings 22 fixed in openings on the cone to allow for relative movement. Fairings 24 are mounted on each set of rods 20 aligned in an axial direction between the cone 18 and the afterburner. When the afterburner is on, fuel is discharged into these gases from a plurality of fuel nozzles 26. One means of supplying fuel is shown and claimed in copending application Serial No. 196,423 filed Nov. 18, 1950. This combustible mixture may be initially ignited within the diffuser by means of an igniter 28 and the flame held by flame holders 30 and 32. Specific igniters of this type are shown and claimed in co-pending applications Serial No. 196,402 filed Nov. 18, 1950 and Serial No. 196,426 filed Nov. 18, 1950. The igniter 28 injects a small amount of extra fuel into combustion chamber 8 where it is ignited and the flame extends into the afterburner where it ignites the combustible mixture in the afterburner. The circular flame holders 30 and 32 which hold the flame are floatably mounted on cross rod 34, which is fixed at one end only, and rods 36 and 38 which project from the side of the afterburner and are fixed at their outer ends to the afterburner. Bushings 40 are fixed in openings on the flame holders 30 and 32 through which the rods pass to allow for relative movement. The gases discharge from the afterburner through the nozzle 42 whose discharge area can be varied by a variable nozzle 44.

The variable nozzle 44 operates between a minimum opening for engine operation alone and a maximum opening, which is the area of the end of nozzle 42, for operation of the engine and afterburner combination.

The nozzle 44 is of the "eyelid" type which consists of two "eyelids" or nozzle sections 46 and their connecting mechanism. An "eyelid" or half nozzle section 46 is formed of a stamped member 48 having an arm 50 fixed on each side to strengthen the stamping and retain the self-aligning bearing 52 which permits pivotal movement of the nozzle section while allowing for expansion of the afterburner. The self-aligning bearing 52 (see Fig. 11) consists of spherical member 54, having a bore 56, mounted within socket member 58.

Stamped member 50 has on its outer side at its pivotal point holding and spacer member 60 which has a recess 62 in which socket member 58 fits. A hole 64 is in the outer side of said arm opposite the holding and spacing member 60. A bearing cover plate 66 having a holding and spacing member 68 with a recess 70, similar to the member 60 on the stamped member, is bolted on the outer side of arm 50 by bolts 72 with the holding and spacing member 68 projecting through the hole 64. Bolts 72 extend through said arm and their heads 74 engage the inner side of stamped member 48. The socket member 58 is fixedly retained in the two recesses 62 and 70 with the spherical member 54 being movable.

An "eyelid" control rod bracket 76 is fixedly mounted on said "eyelid" or nozzle section 46 having two metal ears to receive the engaging end of the "eyelid" control rod 78 to be described hereinafter. A semi-circular member 80 is fixed on the inside of said "eyelid" or nozzle section to strengthen it along its bend 82. This semi-circular strengthening member also supports one half of a two-part seal mating ring 84 which is fixed thereto by bolts. The cooperating sealing ring 86 fixed to said afterburner 10 forms a seal with the seal mating ring when the nozzle sections 46 are in their closed position. Semi-circular members 88 mounted on the outer edges of the "eyelids" or nozzle sections determine the area of the exhaust nozzle. These members, commonly referred to as "eyelashes," are held to the "eyelids" or nozzle sections by bolts 90. An outer semi-circular strengthening member 92 is fixed to each "eyelash" 88. Holes 94 are provided therein to permit access to bolts 90 which connect an "eyelash" 88 to its "eyelid."

A synchronizing link 96 is provided on each side of the nozzle adjacent to the hinge points, which connects the "eyelids" or nozzle sections to synchronize their opening or closing and also to permit both nozzle sections to be opened or closed by one actuating system. This synchronizing link 96 has a self-aligning bearing on each end and is adjustable in length. Two synchronizing link brackets 98 which are provided on each nozzle section have bifurcated portions each to receive one end of a synchronizing link connecting adjacent nozzle sections.

Mounted near the end of the afterburner 10 is a mounting support ring 100 extending around the afterburner having openings 102 and stamped beads 104 therein and having an external flange 106 at its rearward free end. Nozzle mounting ring 108 which is constructed of stamped metal members is bolted to the flange 106 by bolts 110. The mounting ring pivotedly supports the nozzle sections 46. Two diametrically opposed pivotal supports are provided for each nozzle section 46.

A pivotal support consists of a nut 112 located on the inside of plate 114 of mounting ring 108 and having a sleeve 116 which extends through an elongated hole 118 in plate 114 and sets into a sleeve receiving portion 120 in spacer member 122. The plate 114 is serrated on its outside around the elongated hole 118. A plate 124 is provided with serrations to engage the serrations of plate 114 and it is mounted between plate 114 and spacer member 122. The serrated plate 124 and the serrations in plate 114 around elongated hole 118 are provided to permit adjustment of the nozzle section 46 along the length of the elongated hole 118 when necessary and to hold the pivotal support rigidly when in an adjusted position. Bolt 126 extends through a hole in the end of an interlocking brace plate 128, through spacer member 122, through the self-aligning bearing bore 56 and is threadably secured to nut 112. To adjust a nozzle section bolt 112 is loosened permitting movement between the serrations on plates 114 and 124, then the pivotal support is moved to its adjusted position, and then bolt 112 is tightened thereby applying pressure between the serrated portion of plates 114 and 124 to prevent further movement of the pivotal support. The interlocking brace plate 128 extends between bolts 126 of adjacent pivotal supports.

An actuating system for each "eyelid" or nozzle section (see Figs. 2 and 6) consists of a cylinder 130, complex piston 132, connecting control rod 134, "eyelid" control rod 78, piston rod 138, a car 140, and a track mechanism 142 for said car. One end of the connecting control rod 134 is connected to the free end of the piston rod 138 and one end of the "eyelid" control rod 78 is connected between the two ears on the "eyelid" control rod bracket 76 which is fixed on the nozzle. The free meeting ends of the control rods 134 and 78 are connected to car 140. There are two actuating systems on the afterburner, one for each "eyelid" or half section of the nozzle (see Fig. 5). The cylinders 130 and track mechanisms 142 are attached to the afterburner wall. This system brings the entire control system including the cylinders and control rods near the afterburner centerline and thus reduces the space required for installation in an aircraft.

Cylinder 130 (see Fig. 10) is fixedly attached at its rearward end to said afterburner wall and attached at its forward end by a link 144. This attachment permits expansion of the afterburner wall without placing a stress upon any part of the cylinder 130 or the rest of the actuating system. The attachment for the rearward end of the cylinder consists of a U-shaped member 146 fixed to said afterburner with an inverted U-shaped member 148 fitted into said first U-shaped member 146 and bolted thereto by bolts 150. The rearward end of the cylinder is bolted to inverted U-shaped member 148 by bolts 152. The forward attachment for the cylinder consists of a bracket fixed to said afterburner having two metal bosses 154. Link member 144 is pivotally attached at its lower end, one side to each boss 154, and pivotedly attached at its upper end, one side to each boss 156 fixedly mounted on the cylinder. Cylinder 130 has an opening located in each end for a purpose to be described hereinafter.

The complex piston 132 in cylinder 130 is constructed to prevent excessive stress from being transmitted through the piston 132 to the piston rod 138, and therefore through the actuating system and its mounting connections. This complex piston 132 consists of two piston members 158 and 160 mounted on rod 162 between a flange 164 integral with said rod and a nut 166 on the other threaded end of the rod. Piston member 158 is slidably mounted and piston member 160 is fixedly mounted. The piston member 158 is held against the nut 166 by springs 168 and 170 between the members. Piston member 158 has axial projections 172 fixedly attached thereto and extending through holes 174 in piston member 160. The head of cylinder 130 has an annular flange on the inner surface which is engaged by projections 172 to establish the rearward limit of travel for the piston. Piston member 158 has around its engaging edge with said cylinder 130 a piston ring 177. The piston rod 138 passes through opening 176 in the rearward end of the cylinder 130 and is attached to rod 162 by a pin 178.

Piston rod 138 is attached to connecting control rod 134 by a self-aligning bearing. The other end of the connecting control rod 134 is attached to the car 140 by a self-aligning bearing (see Fig. 9). The length of control rod 134 is adjustable in that the end of the rod attached to the car has its self-aligning bearing secured by threads to the tie rod and held in an adjustable position by nut 180. Control rod 78 is similar to connecting control rod 134 wherein one end is attached to the nozzle 44 while its other end is attached to the car 140. The control rods are constructed with self-aligning bearings at both ends so that no bending can occur in the system with any reasonable amount of misalignment of parts due to construction tolerance or distortion due to heat expansion.

Car 140 rides on a track mechanism 142 (see Fig. 7) which is fixedly attached at its forward end to the afterburner and attached at its rearward end by a link (see Fig. 8). The track mechanism consists of a flat plate 182 on which is mounted two side plates 184. These side plates 184 are fixedly attached to flat plate 182 by integral flanges 186 which may be bolted or welded. Channel member 188 is fitted between the side plates 184 and fixed thereto, the side plates having other integral flanges 190 which extend inwardly from their top and form a track with said channel member 188. A short channel member 192 is fixedly attached to the side plates 184 and flat plate 182 at their front ends. Bolts 194 fixedly attach this track mechanism 142 to flanges 196 and 198 on the afterburner. At the rearward end of the track mechanism a link member 200 is pivotally attached at its sides to each of the side plates 184 by bolts 202. The opposite ends of the side of the link are pivotedly attached by bolts 204 to metal ears 206 fixedly mounted on a U-shaped member 208 and pad 210.

The car 140 is formed of two side plates 212 mounted on each side of an inverted channel member 214. Two rollers 216 are bolted to each side of the plates 212 and channel member 214 of the car. While two sets of rollers have been shown any multiple number may be used.

These rollers fit between the flanges 190 of the side plates 184 and the channel member 188. The side plates of the car extend upward through the opening between the flanges 190 of the side plates 184. The upper part of the car has two holes in one side plate opposite like holes in the other side plate to receive bolts 218 and 220. These bolts connect the control rods 134 and 78 to the car.

The control for the admission of fluid to cylinders 130 is shown as a manually operated servo piston control 222. An automatic control is shown and claimed in copending application Serial No. 196,424 filed Nov. 18, 1950. This control 222 serves both cylinders of the two actuating systems. When the manual lever 224 is in the "closed" position it connects openings 226 with a fluid source by conduits 264 and 266 and connects openings 228 to drain, and when it is in its "open" position it connects openings 228 with the fluid source by conduits 260 and 262 and connects openings 226 to drain. While it is evident that any fluid source may be used to operate this actuating system, this control is shown connected to the compressor outlet by conduit 230.

The piston shown in Fig. 12 is of the double acting type. The two piston members 232 and 234, slidably mounted on rod 236 between a flange 238 and a nut 240, each have axial projections 242 fixedly attached thereto extending through holes 244 in the opposite piston member. In this type of piston two valves 246 are provided consisting of a ball 248, a spring and ball retainer 250, a spring 252, a spring retainer 254 and a snap ring 256. These valves are provided in each piston member so that any build-up of pressure in the space between the members is vented to the low pressure side. The build-up of pressure could occur if pressure from the high pressure side could pass by a piston ring 258 to the space between the members.

Operation

Since the afterburner is used to obtain thrusts above those obtainable by the engine alone it will be considered for this operation that the engine is operating at maximum thrust.

For additional thrust above that available from the engine alone, the afterburner is started. This calls for the admission of fuel into the afterburner and the ignition of the combustible mixture formed by the mixture of the fuel with the gases passing through said afterburner. The ignition of this mixture has been previously explained. Upon ignition the flame is kept within the selected area of the afterburner by the flame holders. It is to be understood that the method of fuel injection and combustible mixture ignition form no part of this invention and a means to do so has been disclosed merely to show the connection between afterburner operation and the nozzle actuating system. Any method of fuel injection and combustion ignition may be used.

As soon as the combustible mixture ignites and the flame is held by the flame holders, the nozzle must be immediately opened, since failure to do this causes excessive temperatures to be reached in the turbine of the engine. Since opening of the nozzle prior to the operation of the afterburner causes a loss of thrust from the engine which is not desired, the afterburner nozzle should be opened almost simultaneously with the beginning of combustion in the afterburner.

As the afterburner is started lever 224 is moved to the "open" position. This movement of lever 224 connects openings 226 to drain and openings 228 to the compressor outlet by means of conduits 260 and 262 and conduit 230 which permits high pressure air from the compressor outlet to enter the cylinders 130 and move pistons 132 to the left.

This movement of the pistons 132 moves their respective piston rods 138 to the left which in turn moves the connecting control rods 134 connected thereto in the same direction. Connecting control rods 134 each connected to its associated car 140 on its track mechanism 142 moves the car to the left along the track. The "eyelid" control rods 78 are each pulled by their respective car 140 to move each nozzle section to its open position.

The synchronizing links 96 synchronize the opening of one nozzle section with the other section. In the event one actuating mechanism fails this synchronizing link would open one nozzle section by the movement of the other nozzle section which is moved by the remaining operating actuating system.

In closing the nozzle, as the afterburner is turned off lever 224 is moved to the "closed" position. This movement of lever 224 connects openings 228 to drain and openings 226 to the compressor outlet by means of conduits 264 and 266 and conduit 230 which permits high pressure air from the compressor outlet to enter the cylinders 130 and move pistons 132 to the right.

This movement of the pistons 132 moves their respective piston rods 138 to the right which in turn moves the connecting control rods 134 connected thereto in the same direction. Connecting control rods 134 each connected to its associated car 140 on its track mechanism 142 moves the car to the right along the track. The "eyelid" control rods 78 are each pushed by their respective car 140 to move each nozzle section to its closed position.

It is advantageous not to have an excessive amount of pressure exerted through the actuating system above that which is necessary to close the nozzle. This is overcome by having the projections 172 on piston member 158 project through piston member 160 and come in contact with the annular flange 268 on the rear end of the cylinder when the actuating system has the necessary amount of stress on it for holding a nozzle section in its closed position.

This action divides the piston load into two parts: (1) the spring load which is carried through the actuating system to the nozzle and (2) the air load which is carried directly by the cylinder end and is equalized through the walls of the cylinder. The nozzle "eyelids" normally reach closed position before the projections 172 engage the annular flange 268. Additional fluid entering the cylinder will move the left-hand piston member against the tension of the springs without further motion of piston rod 138 until the projections bottom against the flange and prohibit further movement of the piston parts. Thus the load on the connecting rod will never exceed the pressure applied by the springs.

Although a specific embodiment has been shown and described herein for the purpose of illustration, it will be evident to those skilled in the art that the invention is capable of various modifications and adaptations within the scope of the appended claims.

I claim:

1. A nozzle actuating system for a nozzle on an engine including in combination a cylinder mounted on said engine, one end of said cylinder being fixedly mounted, the other end of said cylinder being pivotally mounted, a piston in said cylinder, a piston rod connected to said piston and extending through one end of the cylinder, a track mechanism mounted on said engine, one end of said track mechanism being fixedly mounted, the other end of said track mechanism being pivotally mounted, a car on said track mechanism, a control rod connecting said piston rod to one end of said car, and a control rod connecting a nozzle to the other end of said car.

2. A nozzle and actuating system on a jet engine including, a nozzle movable between two positions for controlling the size of an opening of a fluid outlet of an engine, said nozzle being formed of two half sections, a cylinder mounted on said engine, one end of said cylinder being fixedly mounted thereto, the other end of said cylinder being pivotally mounted, a piston in said cylinder, a piston rod connected to said piston and extending through one end of the cylinder, a track mechanism mounted on said engine, one end of said track being fixedly mounted thereon, the other end of said track mechanism being pivotally mounted, a car on said track mechanism, a control rod connecting said piston rod to one end of said car, and a control rod connecting said nozzle to the other end of said car, and said nozzle sections having a synchronizing link connecting them.

3. A nozzle and actuating system on a jet engine including, a nozzle movable between two positions for controlling the size of an opening of a fluid outlet of a jet engine, said nozzle being formed of two half sections, a cylinder mounted on said engine, one end of said cylinder being fixedly mounted thereto, the other end of said cylinder being pivotally mounted, a piston in said cylinder, a piston rod connected to said piston and extending through one end of the cylinder, a track mechanism mounted on said engine, one end of said track being fixedly mounted thereon, the other end of said track mechanism being pivotally mounted, a car on said track mechanism, a control rod connecting said piston rod to one end of said car, said control rod having a self-aligning bearing on each end and being adjustable in length, and a control rod connecting said nozzle to the other end of said car, said control rod having a self-aligning bearing on each end and being adjustable in length, and said nozzle sections having a synchronizing link connecting them.

4. A nozzle and actuating system on an engine including a nozzle movable between two positions for controlling the size of an opening of a fluid outlet of a jet engine, said nozzle being formed of two half sections, a cylinder mounted on said engine, one end of said cylinder being fixedly mounted thereto, the other end of said cylinder being pivotally mounted, a complex piston in said cylinder, said complex piston consisting of a rod, two piston members mounted on said rod, stops on said rod one on either side of the piston members, a spring between said piston members to bias them against said stops, one piston member having a projection passing through a hole in the other piston member, a circular flange on the inside of an end of cylinder for said projection to butt against, a piston rod connected to said complex piston and extending through one end of the cylinder, a track mechanism mounted on said engine, one end of said track being fixedly mounted thereon, the other end of said track mechanism being pivotally mounted, a car on said track mechanism, a control rod connecting said piston rod to one end of said car, and a control rod connecting said nozzle to the other end of said car, and said nozzle sections having a synchronizing link connecting them.

5. A nozzle and actuating system on an engine including a nozzle movable between two positions for controlling the size of an opening of a fluid outlet of a jet engine, said nozzle being formed of two half sections, a cylinder mounted on said engine, one end of said cylinder being fixedly mounted thereto, the other end of said cylinder being pivotally mounted, a complex piston in said cylinder, said complex piston consisting of a rod, two piston members mounted on said rod, stops on said rod one on either side of the piston members, a spring between said piston members to bias them against said stops, one piston member having a projection passing through a hole in the other piston member, a circular flange on the inside of an end of cylinder for said projection to butt against, a piston rod connected to said complex piston and extending through one end of the cylinder, a track mechanism mounted on said engine, one end of said track being fixedly mounted thereon, the other end of said track mechanism being pivotally mounted, a car on said track mechanism, a control rod connecting said piston rod to one end of said car, said control rod having a self-aligning bearing on each end and being adjustable in length, and a control rod connecting said nozzle to the other end of said car, said control rod having a self-aligning bearing on each end and being adjustable in length, and said nozzle sections having a synchronizing link connecting them.

6. In an actuating system, a cylinder, a piston in said cylinder, said piston including first and second piston members, a rod, said first and second piston members being retained on said rod, a spring biasing said members apart, a projection on one member, said projection of one member extending through a hole in the other member into said cylinder, a fixed stop in said cylinder to be engaged by said projection, means connected to said piston to convey its movement therewith.

7. In an actuating system, a cylinder, a piston in said cylinder, said piston including first and second piston members, a rod, said first and second piston members being retained on said rod, a spring biasing said members apart, a projection on one member, said projection of one member extends through a hole in the other member into said cylinder, a fixed stop in said cylinder adapted to be engaged by said projection, means connected to said piston to convey its movement to a nozzle, said connecting means including a track mechanism, a car, said car being adapted to move along the length of the track mechanism, a connecting control rod movable by said piston, one end of said connecting control rod being connected to said car, a nozzle control rod, said nozzle control rod being connected at one end to said car, said nozzle being movably attached to said nozzle control rod.

8. A nozzle actuating system for a nozzle on an engine including in combination, a cylinder, one end of said cylinder being fixedly mounted, the other end of said cylinder being mounted for movement relative to said engine, a piston in said cylinder, a piston rod connected to said piston and extending through one end of the cylinder, a track mechanism mounted on said engine, one end of said track mechanism being fixedly mounted, the other end of said track mechanism being pivotally mounted, a car on said track mechanism, a control rod connecting said piston rod to one end of said car, and a control rod connecting a nozzle to the other end of said car.

References Cited in the file of this patent

UNITED STATES PATENTS

| 546,441 | Vogt | Sept. 17, 1895 |
| 1,838,582 | Skillman | Dec. 29, 1931 |
| 2,328,918 | McManus | Sept. 7, 1943 |
| 2,411,895 | Poole | Dec. 3, 1946 |
| 2,514,749 | Dobbins | July 11, 1950 |
| 2,523,842 | Oulianoff | Sept. 26, 1950 |
| 2,546,293 | Berliner | Mar. 27, 1951 |
| 2,635,419 | Ambrose et al. | Apr. 21, 1953 |

FOREIGN PATENTS

| 1,642 | Great Britain | June 17, 1865 |
| 586,571 | Great Britain | Mar. 24, 1947 |